(12) United States Patent
Borman et al.

(10) Patent No.: US 9,963,230 B2
(45) Date of Patent: May 8, 2018

(54) AERIAL DRONE CLEANING DEVICE AND METHOD OF CLEANING A TARGET SURFACE THEREWITH

(71) Applicant: The Procter & Gamble Company, Cincinnati, OH (US)

(72) Inventors: Michelle Lynn Borman, Cincinnati, OH (US); Glenn Allen Bradbury, Mason, OH (US); Su Yon Chang, Mason, OH (US); Larry L. Huston, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 54 days.

(21) Appl. No.: 14/992,195

(22) Filed: Jan. 11, 2016

(65) Prior Publication Data
US 2017/0197713 A1    Jul. 13, 2017

(51) Int. Cl.
| | | |
|---|---|---|
| *G05D 1/00* | (2006.01) | |
| *G06F 7/00* | (2006.01) | |
| *B64C 39/02* | (2006.01) | |
| *A47L 5/12* | (2006.01) | |
| *B08B 1/00* | (2006.01) | |
| *B64D 1/22* | (2006.01) | |
| *G05D 1/10* | (2006.01) | |
| *A47L 11/40* | (2006.01) | |
| *A47L 13/20* | (2006.01) | |

(52) U.S. Cl.
CPC .............. *B64C 39/024* (2013.01); *A47L 5/12* (2013.01); *A47L 11/4066* (2013.01); *A47L 13/20* (2013.01); *B08B 1/006* (2013.01); *B64D 1/22* (2013.01); *G05D 1/0094* (2013.01); *G05D 1/101* (2013.01); *B64C 2201/12* (2013.01)

(58) Field of Classification Search
None
See application file for complete search history.

(56) References Cited

U.S. PATENT DOCUMENTS

| | | | |
|---|---|---|---|
| 4,818,990 A | 4/1989 | Fernandes | |
| 4,867,595 A * | 9/1989 | Hoffman | B25J 15/04 294/86.4 |
| D409,343 S | 5/1999 | Kingry et al. | |
| 6,651,290 B2 | 11/2003 | Kingry et al. | |
| D487,173 S | 2/2004 | Clare et al. | |
| 6,813,801 B2 | 11/2004 | Tanaka et al. | |

(Continued)

FOREIGN PATENT DOCUMENTS

CN    104787342 A    7/2015

OTHER PUBLICATIONS http://www.gizmag.com/aerial-power-drones-solar-panels/34474/; Aerial Power's drones deliver a clean sweep of solar panels; Nick LAVARS; 2 Pages; downloaded Jan. 19, 2016.

(Continued)

*Primary Examiner* — Bhavesh V Amin
(74) *Attorney, Agent, or Firm* — Larry L. Huston (57) ABSTRACT

A drone which can be piloted by a user. The drone has at least one or both of a depending head and an outwardly extending elongate handle. A cleaning sheet may be removably disposed on the head, to clean a target surface, such as a floor or countertop. A duster may be removably disposed on the handle, to clean a target surface, such as an elevated surface or clean personal items.

12 Claims, 4 Drawing Sheets

(56) References Cited

U.S. PATENT DOCUMENTS

| | | | |
|---|---|---|---|
| 7,137,169 B2 | 11/2006 | Murphy et al. | |
| 7,219,386 B2 | 5/2007 | Tsuchiya et al. | |
| D588,770 S | 3/2009 | Koenig et al. | |
| 7,516,508 B2 | 4/2009 | Stackpole, Jr. et al. | |
| 7,803,726 B2 | 9/2010 | Policicchio et al. | |
| 8,214,088 B2 | 7/2012 | Lefebure | |
| 8,251,307 B2* | 8/2012 | Goossen | B64C 39/024 244/23 C |
| 8,474,090 B2* | 7/2013 | Jones | A47L 5/30 15/319 |
| 8,474,761 B2 | 7/2013 | Callou | |
| 8,498,447 B2 | 7/2013 | Derbanne | |
| 8,578,564 B2 | 11/2013 | Policicchio et al. | |
| 8,594,862 B2 | 11/2013 | Callou et al. | |
| 8,615,840 B1* | 12/2013 | Taneda | B60S 1/3404 15/250.04 |
| 8,662,438 B2 | 3/2014 | Savoye et al. | |
| 8,725,314 B2 | 5/2014 | Chaperon et al. | |
| 8,756,746 B2 | 6/2014 | Policicchio | |
| 8,763,197 B2 | 7/2014 | Policicchio et al. | |
| 8,910,340 B2* | 12/2014 | Bradbury | A47L 11/33 15/210.1 |
| 8,931,132 B2 | 1/2015 | Policicchio | |
| 8,958,928 B2 | 2/2015 | Seydoux et al. | |
| 8,983,684 B2 | 3/2015 | Callou et al. | |
| 8,989,924 B2 | 3/2015 | Seydoux et al. | |
| 9,611,038 B2* | 4/2017 | Dahlstrom | B64C 39/024 |
| 2003/0113145 A1* | 6/2003 | Okabayashi | G03G 21/0029 399/350 |
| 2004/0102136 A1* | 5/2004 | Wood | B24B 13/015 451/5 |
| 2005/0015913 A1* | 1/2005 | Kim | A47L 5/30 15/319 |
| 2005/0081888 A1* | 4/2005 | Pung | A47L 13/12 134/6 |
| 2005/0181968 A1* | 8/2005 | Policicchio | A47L 11/33 510/438 |
| 2006/0008660 A1* | 1/2006 | Parkhe | B08B 1/00 428/446 |
| 2006/0048800 A1* | 3/2006 | Rast | A47L 1/02 134/56 R |
| 2006/0190134 A1* | 8/2006 | Ziegler | A22C 17/0013 700/245 |
| 2008/0022484 A1* | 1/2008 | Caruso | A46B 5/0095 15/344 |
| 2008/0077284 A1* | 3/2008 | Swope | G05D 1/101 701/5 |
| 2009/0050750 A1* | 2/2009 | Goossen | B64C 39/024 244/76 R |
| 2012/0234969 A1* | 9/2012 | Savoye | A63H 27/12 244/17.13 |
| 2014/0254896 A1 | 9/2014 | Zhou et al. | |
| 2014/0303814 A1* | 10/2014 | Burema | A01B 79/005 701/3 |
| 2015/0035437 A1 | 2/2015 | Panopoulos et al. | |
| 2015/0120094 A1 | 4/2015 | Kimchi et al. | |
| 2015/0274294 A1* | 10/2015 | Dahlstrom | B64D 1/18 239/722 |
| 2016/0068261 A1 | 3/2016 | Niederberger | |
| 2016/0082460 A1* | 3/2016 | McMaster | B05B 9/007 701/2 |
| 2017/0057636 A1 | 3/2017 | Azaiz | |

OTHER PUBLICATIONS

PCT Search Report PCT/US2017/012026; 13 Pages; dated Mar. 22, 2017.

* cited by examiner

AERIAL DRONE CLEANING DEVICE AND METHOD OF CLEANING A TARGET SURFACE THEREWITH

FIELD OF THE INVENTION

The present invention relates to a device for cleaning hard surfaces and more particularly to a remote controlled device having the ability to clean surfaces disposed at various elevations.

BACKGROUND OF THE INVENTION

Cleaning of hard surfaces, such as floors, can be a challenging task. Typically when cleaning a floor, a user employs a stick-type cleaning implement according to commonly assigned U.S. Pat. No. D409,343 and/or D588,770. Such a cleaning implement may comprise a plastic head for holding a cleaning sheet and an elongate handle articulably connected thereto. The handle may comprise a metal or plastic tube or solid rod. The handle may be spring biased in known fashion towards a predetermined position.

The head may have a downwardly facing surface, to which the sheet may be removably attached. The downwardly facing service may be generally flat, or slightly convex. The head may further have an upwardly facing surface. The upwardly facing surface may have a universal joint to facilitate connection of the elongate handle to the head.

The upwardly facing surface may further comprise a mechanism, such as resilient grippers, for removably attaching the cleaning sheet to the implement according to commonly assigned U.S. Pat. No. 6,651,290 and/or D487,173. Alternatively, a hook and loop system may be used to attach the cleaning sheet to the head.

Such cleaning implements may have vacuum type suction to assist in removal of debris according to the teachings of U.S. Pat. No. 7,137,169. The implement may have an axially rotatable beater bar according to commonly assigned U.S. Pat. No. 8,910,340. A motorized implement may be made according to commonly assigned U.S. Pat. No. 7,516,508. Debris removed from the target surface may be collected in a dust bin. The dust bin may be mounted within the head, or, alternatively, on the elongate handle.

But such a cleaning implement may not be suitable for all users. The user may be of limited mobility or not have the dexterity to manipulate the handle. An elderly user may tire before the cleaning task is completed, due to the bipedal motion and manipulation of the cleaning device. Thus, cleaning according to the prior art may be infeasible for such a user.

Furthermore, not all cleaning tasks occur at floor level. Surfaces such as shelves, countertops and items such as vases and picture frames are often cleaned of light debris using dusters. A common disposable duster comprises one or more nonwoven sheets having one or more layers of tow fibers joined thereto, to provide a laminate structure as described in U.S. Pat. No. 6,813,801 and according to commonly assigned U.S. Pat. Nos. 7,803,726; 8,756,746; 8,763,197 and 8,931,132. Such dusters are often removably attached to an elongate handle using friction or mechanical engagement according to the teachings of U.S. Pat. No. 7,219,386 and/or commonly assigned U.S. Pat. No. 8,578,564.

But manually dusting with such a duster may not always be feasible. The user may not have the dexterity needed to complete the task. Or items to be cleaned may be out of reach. For example, the items may be too high or obscured by other objects. Cleaning according to the prior art may be infeasible for such a user or for objects disposed out of reach.

Accordingly a new approach is needed, which provides for users of limited mobility/dexterity the capability to clean a floor. Likewise, a new approach is needed to dust objects out of reach of healthy persons and to clean elevated objects which cannot be cleaned by persons of limited mobility/dexterity.

The invention proposes to use aerial drones to assist in certain cleaning tasks. Drones are commonly used for hobby purposes. Drones may also be used for utilitarian purposes. For example, drones may be used to monitor power lines, as discussed in U.S. Pat. No. 4,818,990 or to deliver mail, as discussed in US 2014/0254896. US 2015/0274294 teaches the use of an aerial vehicle which sprays water/soap onto a window. But 2015/0274294 does not teach how to overcome waterspots left by the spraying or how to clean debris not removed by the spray. Drones have been proposed to clean outdoor solar panels using brooms, where ambient dust can be swept from the solar panel onto the ground. But such an approach is unsuitable for indoor residential and commercial cleaning. Dust and dirt cannot simply be broomed onto the floor—where the occupant may simply track the dust and debris to other rooms. Various drones are discussed in U.S. Pat. Nos. 8,214,088; 8,474,761; 8,498,447; 8,594,862; 8,662,438; 8,725,314; 8,958,928; 8,983,684; 8,989,924; 2015/0120094 and 2015/035437. The present invention overcomes the problems of users not being able to employ conventional cleaning implements for certain hard surface cleaning tasks.

SUMMARY OF THE INVENTION

In one embodiment the invention comprises a drone suitable for cleaning tasks. The drone comprises a chassis for holding components of the drone, at least one rotary wing driven by a respective motor, a controller for piloting the drone in speed and altitude relative to a target surface, at least one strut depending from the chassis and a head connected to the strut, the head having a downwardly facing surface to removably receive a cleaning sheet thereon.

In another embodiment the invention comprises a drone suitable for cleaning tasks as described above, the drone comprising an elongate handle connected to the chassis at a proximal end and extending outwardly therefrom to a distal end, the handle being configured to removably receive a cleaning duster thereon.

In another embodiment the invention comprises a method of cleaning a target surface using a drone. The method comprises the steps of providing a drone suitable for cleaning tasks, the drone comprising: a chassis for holding components of the drone; at least one rotary wing driven by a respective motor; a controller for piloting the drone in speed and altitude relative to a target surface; and at least one of an elongate handle connected to the chassis at a proximal end and extending outwardly therefrom to a distal end, the handle being configured to removably receive a cleaning duster thereon and a head having a downwardly facing surface to removably receive a cleaning sheet thereon. The method also comprises the step of providing a duster or a cleaning sheet complementary to the handle or to the head, respectively, removably disposing the duster or the sheet onto the handle or the head, piloting the drone to a target surface; and contacting the duster or a cleaning sheet with the target surface to clean debris therefrom.

DETAILED DESCRIPTION OF THE INVENTION

Figure 1A:
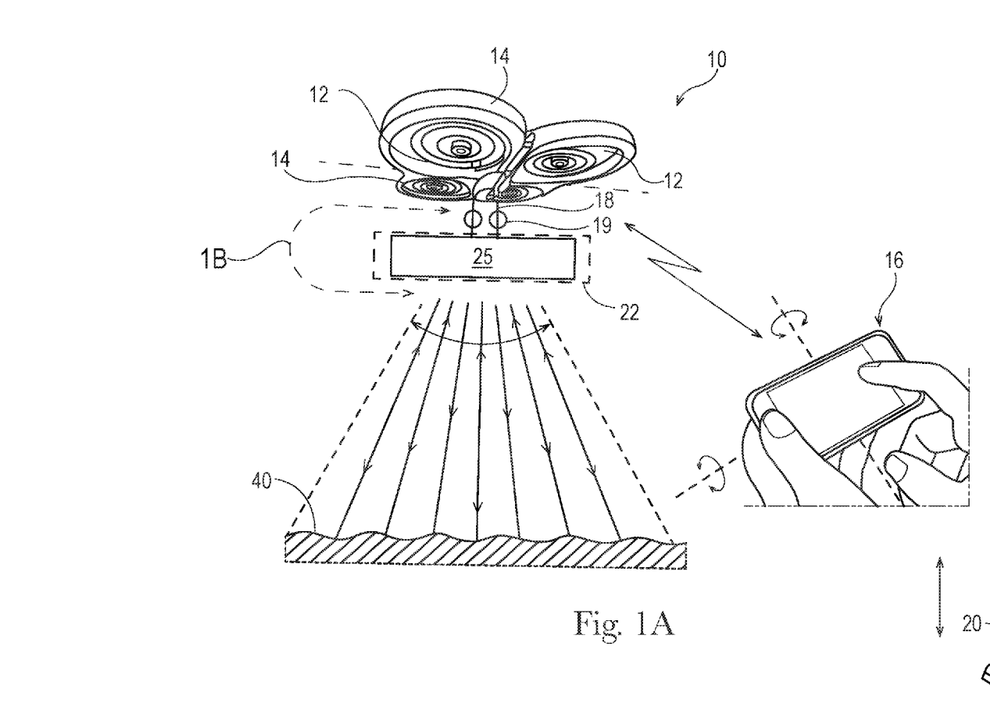
FIG. 1A is a diagrammatic view of a piloting device and a drone suitable for being controlled by piloting said device in accordance with the invention, the cleaning sheet being shown in phantom.
Figure 1B:
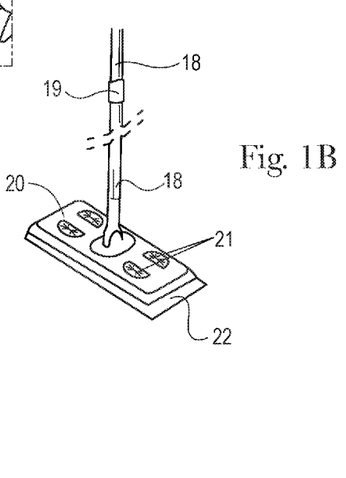
FIG. 1B is an enlarged, perspective view of the strut, shock absorber and head in FIG. 1A.

Referring to FIGS. 1A and 1B, a drone (10) is a flying machine which is remotely piloted by means of a control device. A drone (10) according to the present invention may be fixed wing (12), or more likely rotary wing (12), comprising one or more rotors held in position by a chassis (14). The rotors may be driven by independently controllable respective motors so the drone (10) can be controlled in attitude, speed and ground position. Each motor may be controlled by a respective microcontroller. The set of microcontrollers may be controlled by a central controller. A drone (10) having four such motors and four respective controllers is commonly referred to as a quadricopter.

The rotary wing (12) may define a plane. Components of the drone (10) may be referenced to this plane. For example, a head (20) for removably receiving a cleaning sheet (22) may be disposed below this plane, while a handle (30) for removably receiving a duster (32) may be disposed below, coplanar with, parallel to or above this plane.

An asynchronous serial communication link may be provided between the central controller and each microcontroller. The central controller may send simultaneous, synchronous control messages with at least one instruction specified by an address parameter of a destination microcontroller. The destination microcontroller extracts and executes the respective instruction. The control messages may be synchronized and executed as described in U.S. Pat. No. 8,725,314 assigned to Parrot of Paris France and incorporated herein by reference.

The drone (10) may be controlled through signals emitted by a tilt sensor, with the sensor moves being replicated by the drone (10), so that the drone (10) may tilt about a desired pitch axis relative to the horizontal plane. Other commands may include climb/descent from a throttle control and right/left rotation about a yaw axis.

The drone (10) may measure altitude, i.e. instantaneous position in the vertical direction relative to a fixed system, such as a Galilean system. Altitude may be measured by an ultrasound telemeter, commonly referred to as an altimeter, and comprising an acoustic transducer which remits/receives ultrasounds. The time separating emission and reception is proportionate to and allows determination of the distance to a target surface (40). A typical transducer emits echoes in a 55 degree cone aperture at a frequency of 25 Hz. A barometric pressure sensor may be used to measure variations in atmospheric pressure in flight. The pressure corresponds to altitude. In some embodiments, the drone (10) may include a radar and/or lidar. The radar can be used to determine the range, altitude, direction or speed of objects. Lidar measures distance by illuminating a target with a laser and analyzing the reflected light, thus providing accurate 3D mapping of the environment and specific objects.

Multiple telemeter and pressure sensors may be used in conjunction to control the attitude as described in U.S. Pat. No. 8,989,924 assigned to Parrot of Paris, France and incorporated herein by reference. If desired, a microwave radar system may be used to avoid humans, pets and other objects.

An altitude of zero may correspond to a reference position on the floor, a tabletop, countertop or other target surface (40). Knowing (12) the difference in height between various target surfaces (40), one of ordinary skill can advantageously adapt the drone (10) of the present invention to clean floors and various other surfaces at different elevations. For example, the same drone (10), appropriately fitted as described below may be used to clean crumbs from a floor, dust a second story window and clean cobwebs from a third floor ceiling in a single cleaning task.

The drone (10) may be piloted by a piloting device (16), including but not limited to a phone or a multimedia player having a touch screen and an integrated accelerometer, for example a cellular phone of the iPhone type or a multimedia player or tablet of the iPod Touch or iPad type (registered trademarks of Apple Inc., USA), as are known in the art. Communication with the drone (10) may occur from the phone, tablet or player via a wired or wireless connection as are known in the art. Suitable wireless connections include WiFi IEEE 802.11 and Bluetooth (registered trademark). Control signals received by the drone (10) may articulate the drone (10) about the pitch and roll axes using a local reference frame relative to an absolute reference frame to determine angular orientation. A suitable pitch/roll control scheme is described in U.S. Pat. No. 8,594,862 assigned to Parrot of Paris, France and incorporated herein by reference.

Proprioceptive sensors used with the drone (10) can sense position, orientation and speed of the drone (10). For example, accelerometers are used to measure acceleration, from which velocity can be calculated by integration; tilt sensors to measure inclination; force sensors to measure contact force with environment; position sensors indicate the actual position of the drone (10), from which the velocity can be calculated by derivation. Information about contact force with a target surface (40) and drone (10) current/desired motion to maintain dynamic balance is useful for completing the cleaning task described herein. The drone (10) may be equipped with one or more accelerometers, three-axis gyrometers and/or altimeters.

Arrays of tactels can be used to receive data on objects touched by the drone (10). The arrays of tactels, i.e. tactile sensors, provide information about forces and torques transferred between the drone (10) and the objects, particularly a target surface (40) being cleaned. The tactels allow the user to know whether or not the correct force is being applied to the target surface (40) for efficacious cleaning. The drone (10) may be moved from position to position, as described in 2015/0120094, incorporated herein by reference.

To produce an image of the surroundings, the drone (10) can have vision sensors, such as charge-coupled device (CCD) cameras. Sound sensors (e.g. microphones) may optionally allow the drone (10) to hear speech and environmental sounds, recognize objects and determine properties of the objects. Ultrasonic sensors measure speed and distances to surrounding objects. Vision sensors enable omni-directional imaging (360-degree) high definition video capture. Infrared sensors provide thermal imaging. The drone (10) may particularly be equipped with one or more cameras, such as a vertical view and/or front view camera.

The drone (10) may be capable of hovering under autopilot. The drone (10) may use a vertically oriented camera to continuously update a multi-representation of a pyramid of images. For each image an iterative optical flow algorithm provides a texturing parameter representative of the microcontrasts in the picked-up scene and an approximation of the speed. If predetermined criteria are satisfied, the drone (10) may switch from the optical-flow algorithm to a corner detector algorithm. This process allows the drone (10) to hover for cleaning as described herein. Suitable drones (10), methods of piloting and methods for evaluating horizontal speed to allow cleaning are described in U.S. Pat. No. 8,474,761 and U.S. Pat. No. 8,498,447, both assigned to Parrot of Paris, France and incorporated herein by reference. The drone (10) may have a self-contained stabilizer system as described in U.S. Pat. No. 8,214,088 assigned to Parrot of Paris, France and incorporated herein by reference.

Motion of the drone (10) can be realized by actuators. The actuators can include electric, pneumatic, hydraulic, piezoelectric, ultrasonic, and other actuators. Hydraulic and electric actuators have a very rigid behavior and can only be made to act in a compliant manner through the use of relatively complex feedback control strategies. While electric coreless motor actuators are better suited for high speed and low load applications, hydraulic ones operate well at low speed and high load applications.

Piezoelectric actuators generate a small movement with a high force capability when voltage is applied. They can be used for ultra-precise positioning and for generating and handling high forces or pressures in static or dynamic situations.

Ultrasonic actuators are designed to produce movements in micrometer order at ultrasonic frequencies (over 20 kHz). They are useful for controlling vibration, positioning applications and quick switching.

Pneumatic actuators operate on the basis of gas compressibility. As they are inflated, they expand along the axis, and as they deflate, they contract. If one end is fixed, the other will move in a linear trajectory. These actuators are intended for low speed and low/medium load applications. Between pneumatic actuators there are: cylinders, bellows, pneumatic engines, pneumatic stepper motors and pneumatic artificial muscles.

The drone (10) may have mapping capability. The mapping capability may allow the drone (10) to learn a route and repeat this route for future cleaning. If desired, the drone (10) could clean according to a predetermined route and optionally on a set schedule, such as, for example, when the user is sleeping, away from the house or other building to be cleaned. If desired, the drone (10) may be connected to the internet, so that the user remotely knows the cleaning cycle has begun or may remotely activate the cleaning cycle.

Prophetically, drones (10) suitable for modification to be used with the present invention are made by A.R. Drone (10) of Parrot SA, of Paris, France; under model numbers PF722000 and PF721802BI; by DJI Drones (10) of Shenzhen, China, as Inspire 1 [ASIN: B017MPAPLE], Phantom 2 Vision+[ASIN: B00PCTNVSC], Phantom 3 [ASIN: B0141PGNSC]; by Blade of Champaign, Ill. under model number BLH8160 [350 QX3]; Guangzhou Walkera Technology Co. Ltd of Guangzhou, China under model number WK-SCOUTX4-RTF2 and IDS Corporation of Pisa, Italy under models numbers IA-17 Manta [fixed wing (12)], SD-150 Hero, IA-12 Stark and IA-3 Colibiri.

Referring particularly to FIG. 1B, the drone (10) may have a chassis (14) with one, two, four or more depending struts (18), as is known in the art. A head (20) may be fixedly or pivotally attached to the strut(s) (18) with a single strut (18) in a pedestal configuration being contemplated. If a single strut (18) is used, the head (20) may be mounted to the strut (18) with a fixed connection, a ball and socket joint, universal joint, single axis hinge or other connection. The strut (18) may be telescoping to allow for differential positioning of the head (20) relative to the chassis (14) of the drone (10).

The head (20) may be mounted in a manner similar to that described in U.S. Pat. No. 8,662,438 assigned to Parrot of Paris, France and incorporated herein by reference. The head (20) may have shock absorbers (19) for vertical dampening, to minimize impact and absorb compressive forces between the head (20) and target surface (40) during cleaning. The shock absorbers (19) may be mounted between the chassis (14) and the head (20), and particularly may be parallel to or incorporated into the struts (18). Suitable shock absorbers (19) may be hydraulic or pneumatic, as are well known in the art and/or simply may be springs (33) to absorb compressive loads. The shock absorbers (19) may have significant vertical travel, to accommodate asperities and irregularities in the target surface (40) and differences in elevation between adjacent target surfaces (40).

The head (20) has a downwardly facing surface which is oriented towards a target surface (40) to be cleaned. The head (20) may be attached to the struts (18) at sides and/or at a top surface. The upwardly facing surface of the head (20) may comprise grippers (21), as are known in the art and discussed herein. The downwardly facing surface may comprise hook fasteners, as are known the art. The grippers (21) and/or hook fasteners may be used to attach a cleaning sheet (22) to the head (20).

The head (20), and particularly the downwardly facing surface thereof, may removably receive a cleaning sheet (22), as described above. The cleaning sheet (22) according to the present invention may comprise a nonwoven. The nonwoven may be synthetic and/or have cellulosic fibers therein. The synthetic fibers may comprise carded, staple, wet laid, air laid and/or spunbond fibers. The nonwoven cleaning sheet (22) may be made according to a hydroentangling process to provide a texture and a basis weight of about 20 to about 120 gsm. Or the cleaning sheet (22) may comprise a reusable microfiber cloth, as is known in the art.

The head (20) can further comprise an agitator, such as a rotatably mounted brush, or an oscillating or otherwise movable cleaning sheet (22) for agitating and loosening foreign matter, such as dirt, dust and the like. Alternatively or additionally, the head (20) can also include a sweeper assembly provided by a rotatably mounted brush and dirt collection bin for collecting dirt and dust.

Optionally, the cleaning sheet (22) may further comprise an additive, to improve cleaning performance and/or enhance the cleaning experience. The additive may comprise wax, such as microcrystalline wax, oil, adhesive, perfume and combinations thereof.

The cleaning sheet (22) according to the present invention may be made according to commonly assigned U.S. Pat. Nos. 6,305,046; 6,484,346; 6,561,354; 6,645,604; 6,651,290; 6,777,064; 6,790,794; 6,797,357; 6,936,330; D409,343; D423,742; D489,537; D498,930; D499,887; D501,609; D511,251 and/or D615,378.

If desired, the cleaning sheet (22) may be pre-moistened. If the cleaning sheet (22) is pre-moistened, it is preferably pre-moistened with a liquid which provides for cleaning of the target surface (40), such as a floor, but yet does not require a post-cleaning rinsing operation.

The pre-moistened cleaning sheet (22) may comprise natural or synthetic fibers. The fibers may be hydrophillic, hydrophobic or a combination thereof, provided that the cleaning sheet (22) is generally absorbent to hold, and express upon demand, a cleaning solution. In one embodiment, the cleaning sheet (22) may comprise at least 50 weight percent or at least 70 weight percent cellulose fibers, such as air laid SSK fibers. If desired, the cleaning sheet (22) may comprise plural layers to provide for scrubbing, liquid storage, and other particularized tasks for the cleaning operation.

The cleaning sheet (22) may be loaded with at least 1, 1.5 or 2 grams of cleaning solution per gram of dry substrate, but typically not more than 5 grams per gram. The cleaning solution may comprise a surfactant, such as APG surfactant which minimizes streaking since there is typically not a rinsing operation, agglomerating chemicals, disinfectants, bleaching solutions, perfumes, secondary surfactants etc.

Optionally, the pre-moistened cleaning sheet (22) may further comprise a scrubbing strip. A scrubbing strip is a portion of the cleaning sheet (22) which provides for more aggressive cleaning of the target surface (40). A suitable scrubbing strip may comprise a polyolefinic film, such as LDPE, and have outwardly extending perforations, etc. The scrubbing strip may be made and used according to commonly assigned U.S. Pat. Nos. 8,250,700; 8,407,848; D551,409 S and/or D614,408 S. A suitable pre-moistened cleaning sheet (22) maybe made according to the teachings of commonly assigned U.S. Pat. No. 6,716,805; D614,408; D629,211 and/or D652,633.

The cleaning sheet (22) may comprise plural layers disposed in a laminate. The lowest, or downwardly facing outer layer, may comprise apertures to allow for absorption of cleaning solution therethrough and to promote the scrubbing of the target surface (40). Intermediate layers may provide for storage of the liquids, and may comprise the absorbent gelling materials. The cleaning sheet (22) may have an absorbent capacity of at least 10, 15, or 20 grams of cleaning solution per gram of dry cleaning sheet (22), as set forth in commonly assigned U.S. Pat. Nos. 6,003,191 and 6,601,261.

The top layer, or upwardly facing outer layer, maybe liquid impervious in order to minimize loss of absorbed fluids. The top layer may further provide for releasable attachment of the cleaning sheet (22) to a cleaning implement. The top layer may be made of a polyolefinic film, such as LDPE.

The drone (10) may further comprise a reservoir (24) for dispensing cleaning solution therefrom. The reservoir (24) may be replaced when the cleaning solution is depleted and/or refilled as desired. The reservoir (24) may be disposed on the struts (18), adjacent the head (20). The cleaning solution contained therein may be made according to the teachings of commonly assigned U.S. Pat. No. 6,814,088. If desired, the reservoir (24) may be maintained on the ground at a base station. Cleaning solution therein may be supplied to the drone (10) via a tether, as described in US 2015/0274294, paragraph 51 and FIG. 9, incorporated herein by reference. Liquid from the ground-based reservoir (24) may be supplied to the drone (10) by a pump also disposed at the base station.

The cleaning implement may further comprise a battery powered pump for dispensing cleaning solution from the reservoir (24) onto the target surface (40). The cleaning solution may be sprayed through one or more nozzles to provide for distribution of the cleaning solution onto the target surface (40) in an efficacious pattern. Prophetically it is believed that dispersion of the solution advantageously occurs if sprayed from an appropriate height above the target surface (40).

The target surface (40) need not be limited to horizontal surfaces, but may also include vertical or skewed surfaces (40) such as a toilet, shower or window. In such an execution the head (20) may be oriented to extend from the side of the chassis (14), in order to clean a vertical surface with the cleaning sheet (22).

If a replaceable reservoir (24) is utilized, the replaceable reservoir (24) may be inverted to provide for gravity flow of the cleaning solution. The reservoir (24) may be a bottle, and may made of plastic, such as a polyolefin. The drone (10) may have a needle to receive the cleaning solution from the bottle. The bottle may have a needle piercable membrane, complementary to the needle, and which is resealed to prevent undesired dripping of the cleaning solution during insertion and removal of the replaceable reservoir (24). Alternatively or additionally, if desired, the head (20) may also provide for steam to be delivered to the cleaning sheet (22) and/or to the floor or other target surface (40).

If desired, the drone (10) may have two or more heads (20). Each head (20) may receive a cleaning sheet (22) thereon. The cleaning sheets (22) may be identical or different, as desired. While indoor cleaning is described herein, outdoor cleaning and other outdoor uses are also contemplated.

The drone (10) may have a docking station. The docking station may provide for recharging the drone (10). The docking station may also provide a source of cleaning solution for automatic or manual replenishment of the reservoir (24). If the drone (10) collects dirty cleaning solution, the same may be dumped into the docking station for disposal. Cleaning sheets (22) may also be stored in the docking station.

Figure 2A:
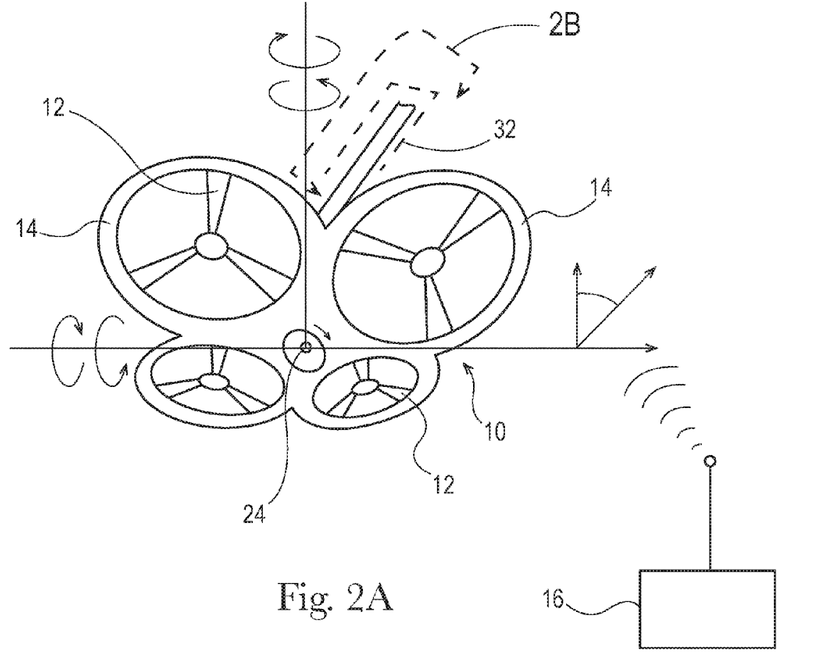
FIG. 2A is a diagrammatic view of a piloting device and a drone suitable for being controlled by piloting said device in accordance with the invention, the duster being shown in phantom.
Figure 2B:
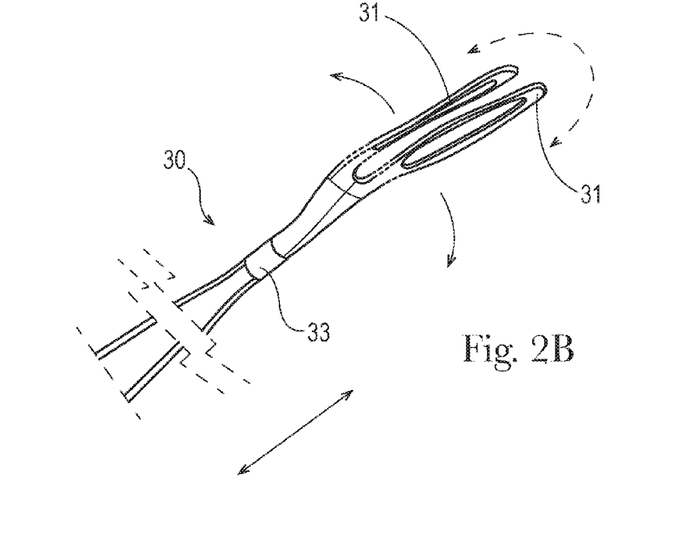
FIG. 2B is an enlarged, perspective view of the handle in FIG. 2A.

Referring to FIGS. 2A and 2B, in an alternative embodiment, the drone (10) may have a handle (30) for removably receiving a duster (32) thereon. The handle (30) may extend laterally and/or upwardly from the chassis (14) of the drone (10) or extend from a strut (18) of the drone (10). If the duster (32) is disposed coplanar with or preferably above the wings (12), prophetically propwash will not blow debris off the duster (32) during cleaning.

The handle (30) may be fixedly or pivotally attached to the strut (18) or chassis (14). If the handle (30) is pivotally attached, it may be downwardly biased with a spring (33), so that undue shock is not imparted to the target surface (40) while adequate force is applied for dusting.

The duster (32) can be used to dust and clean surfaces which are difficult to reach during cleaning. For example, elevated surfaces such as ceiling fans, second story window sills, cathedral ceilings, etc. can be cleaned using a duster (32) attached the drone (10) of the present invention.

Referring particularly to FIG. 2B, the handle (30) may comprise one or more fork tines (31) which engage one or more complementary sleeves of a duster (32). The fork tines (31) may be removably inserted into the sleeves of the duster (32) and held in place by mechanical engagement or a friction fit. The handle (30) may be plastic and made according to the teachings of U.S. Pat. Nos. 7,219,386; 7,293,317, 7,383,602 and/or commonly assigned U.S. Pat. No. 8,578,564.

If desired, the handle (30) may be a telescoping handle (30) using projections and through holes, as are known in the art and disclosed in U.S. Pat. No. 7,219,386 at FIGS. 6A-10B incorporated herein by reference. In such an embodiment, the handle (30) may be retracted for takeoff and landing of the drone (10). The handle (30) may be extended while the drone (10) is airborne or otherwise in position for cleaning with the duster (32). Optionally the handle (30) may be bent to allow for convenient dusting of the target surface (40) with the duster (32). Optionally the handle (30) may pivot relative to the chassis (14), using a crenulated and recessed member with a retractable locking projection, as disclosed in U.S. Pat. No. 7,293,317 at FIGS. 5A-6B, incorporated herein by reference.

In another embodiment, the duster (32) may be removably disposed on one or more wings (12), each wing (12) being coupled to a motor by an axially rotatable rotor. This arrangement provides the benefit that the rotary motion of the wing (12) provides relative movement of the duster against a target surface (40), particularly the underside thereof.

If desired, the duster (32) or cleaning sheet (22) may be disposed on a dedicated, axially rotatable rotor which is not associated with a wing (12). This arrangement provides the benefit that the wings (12) do not have the added drag forces of the duster duster (32) or cleaning sheet (22) thereon. And the dedicated rotor can be optimized for length, angle and position so that the duster (32) or cleaning sheet (22) may reach the target surface (40).

In use, the user manually loads the drone (10) with a cleaning sheet (22) removably disposed on the bottom of the head (20) and/or a duster (32) on the handle (30). The reservoir (24) may be filled if wet cleaning is desired and dirt bin empties if a vacuum is used.

Figure 2C:
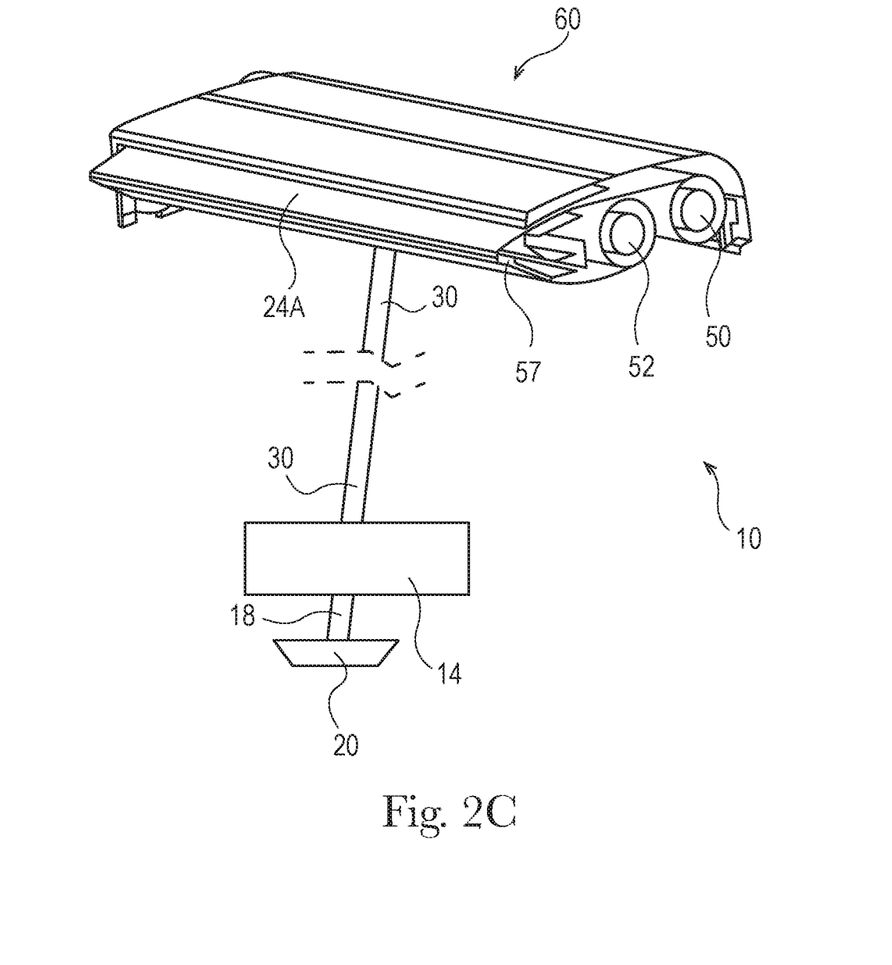
FIG. 2C is a partially schematic, perspective view of a drone having a squeegee and optional cleaning sheet on the squeegee.

Referring to FIG. 2C, the drone (10) may include a squeegee (60). The squeegee (60) may be mounted on handle (30), which, in turn is joined to the chassis (14). The squeegee (60) may have a rubber blade (57) for sliding contact against the target surface (40). The squeegee (60) may be used for removal of liquid cleaning solution sprayed from the drone (10) onto the target surface (40). The cleaning sheet (22) may then be used for further cleaning of the target surface (40).

Optionally, the squeegee (60) may have a sheet (24A) which renews the blade surface. The sheet (24A) may longitudinally advance from a supply roll (50), traverse the blade of the squeegee (60) and be collected on a takeup roll (52). The sheet (24A) may be manually advanced or advanced using a crank, knob or trigger mechanism as disclosed in commonly assigned U.S. Pat. No. 8,578,543 at FIGS. 13, and 15-18, incorporated herein by reference.

Figure 3A:
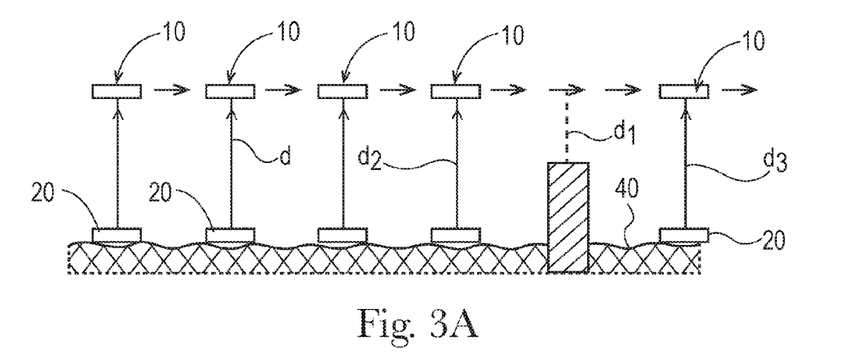
FIG. 3A is a schematic side elevational view of a drone cleaning a target surface.
Figure 3B:
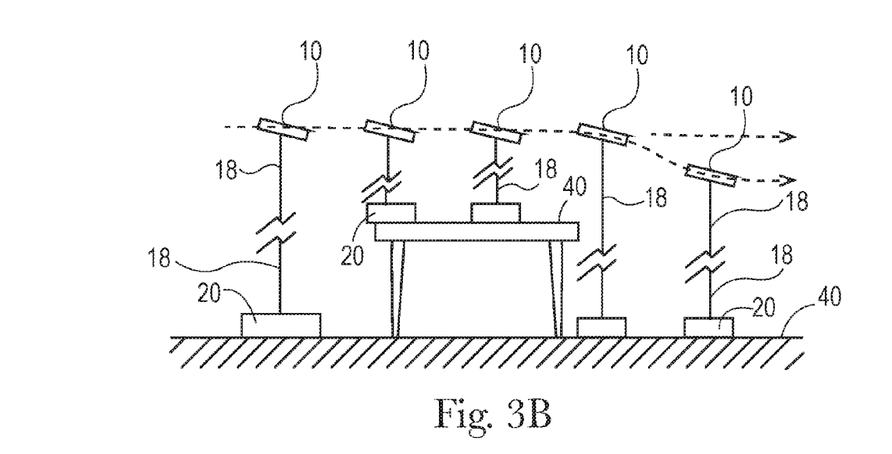
FIG. 3B is a schematic side elevational view of a drone cleaning a floor and a table.

Referring to FIGS. 3A and 3B, the user pilots the drone (10) to the target surface (40). The user may manually control the drone (10) throughout the cleaning cycle, so that compressive force is applied to the target surface (40) to effect cleaning. The shock absorber (19) and control system may account for variations in distance d1-d3 to the target surface (40). The user may repeat areas heavily soiled or where additional attention is needed. Alternatively or additionally the drone (10) may be automatically piloted through a known course or pre-programmed path or piloted using GPS as is known in the art. If desired, the drone (10) may be used outdoors, and piloted through different sites, each having one or more target surfaces (40) as described in 2015/0120094 incorporated herein by reference.

This arrangement provides the benefit that the user may clean a first target surface (40) with the drone (10), then pilot the drone (10) to a second, distant target surface (40), third target surface (40), etc. The second target surface (40) need not be at the same elevation as the first surface. For example, the first target surface (40) may be a kitchen and the second target surface (40) may be an entryway, separated from the kitchen by steps. Or the first target surface (40) may be a table or countertop, and the next target surface (40) may be a floor.

After cleaning the drone (10) is piloted so that it returns to the user. The user then removes the soiled cleaning sheet (22) and replaces it as desired, and/or replenishes cleaning fluid in the reservoir (24).

Of course, one of skill will recognize the user may separately load a duster (32) onto the complementary handle (30) for cleaning. The user may then pilot the drone (10) throughout a predetermined course or ad hoc, as needed to complete the cleaning task. Alternatively or additionally the drone (10) may be automatically piloted through a known course or pre-programmed path or piloted using GPS as is known in the art.

This arrangement provides the benefit that the user may clean a first target surface (40) with the drone (10), then pilot the drone (10) to a second, distant target surface (40), third target surface (40), etc. The second target surface (40) need not be at the same elevation as the first surface. For example, the first target surface (40) may be a shelf at waist level, the next surface may be a tray ceiling, the next object to be cleaned may be a recessed light in the ceiling, the next object an elevated over a balcony, etc. all at different elevations.

After cleaning the drone (10) is piloted so that it returns to the user. The user then removes the soiled duster (32) and replaces it as desired, and/or replenishes the cleaning fluid in the reservoir (24) and/or the cleaning sheet (22), as desired.

A. In one embodiment the invention comprises a drone (10) suitable for cleaning tasks, said drone (10) comprising:
a chassis (14) for holding components of the drone (10);
at least one rotary wing (12) driven by a respective motor;
a controller for piloting the drone (10) in speed and altitude relative to a target surface (40); at least one strut (18) depending from the chassis (14); and
a head (20) connected to said strut (18), the head (20) having a downwardly facing surface to removably receive a cleaning sheet (22) thereon.

B. A drone (10) according to paragraph A wherein the head (20) has an upwardly facing surface opposed to the downwardly facing surface and further comprising at least one of a plurality of grippers (21) disposed on the upwardly facing surface of the head (20) and a plurality of hooks disposed on the downwardly facing surface of the head (20), the grippers (21) and hooks being usable to removably attach a cleaning sheet (22) to the head (20).

C. A drone (10) according to paragraphs A and B further comprising at least one of a vacuum source and a beater bar disposed on the head (20) and being usable to collect debris from a target surface (40).

D. A drone (10) according to paragraph C wherein the vacuum source or beater bar are driven by a dedicated electric motor, the dedicated motor not being configured to drive a rotor.

E. A drone (10) according to paragraphs A, B, C and D comprising plural struts (18), and further comprising a shock absorber (19) operatively mounted between each strut (18) and the head (20) for absorbing compressive forces between the head (20) and a target surface (40).
F. A drone (10) according to paragraphs A, B, C, D and E further comprising a cleaning sheet (22) removably disposed on the head (20).
G. In one embodiment the invention comprises a drone (10) suitable for cleaning tasks, said drone (10) comprising:
A chassis (14) for holding components of the drone (10);
at least one rotary wing (12) driven by a respective motor;
a controller for piloting the drone (10) in speed and altitude relative to a target surface (40); and
an elongate handle (30) connected to said chassis (14) at a proximal end and extending outwardly therefrom to a distal end, said handle (30) being configured to removably receive a cleaning duster (32) thereon.
H. A drone (10) according to paragraph G wherein said rotary wing (12) defines a plane, said elongate handle (30) being generally parallel to said plane, and optionally said elongate handle (30) being generally coplanar with said plane or disposed above a said at least one wing (12) when said drone is in use.
I. A drone (10) according to paragraphs G and H wherein said elongate handle is a telescoping handle.
J. A drone (10) according to paragraphs G, H and I wherein said handle (30) is spring (33) biased towards a predetermined position.
K. A drone (10) according to paragraphs G, H, I and J wherein said handle is joined to an axially rotatable rotor.
L. In one embodiment the invention comprises a method of cleaning a target surface (40) using a drone (10), said method comprising the steps of:
providing a drone (10) suitable for cleaning tasks, the drone (10) comprising: a chassis (14) for holding components of the drone (10); at least one rotary wing (12) driven by a respective motor; a controller for piloting the drone (10) in speed and altitude relative to a target surface (40); and
at least one of an elongate handle (30) connected to said chassis (14) at a proximal end and extending outwardly therefrom to a distal end, said handle (30) being configured to removably receive a cleaning duster (32) thereon and a head (20) having a downwardly facing surface to removably receive a cleaning sheet (22) thereon;
providing a duster (32) or a cleaning sheet (22) complementary to said handle (30) or to said head (20), respectively;
removably disposing said duster (32) or said sheet onto said handle (30) or said head (20); piloting said drone (10) to a target surface (40); and
contacting said duster (32) or a cleaning sheet (22) with the target surface (40) to clean debris therefrom.
M. A method according to paragraph L having a duster (32) disposed on a complementary handle (30), and said step of piloting said drone (10) comprises piloting said drone (10) to an elevated position outside the reach of the user to clean debris therefrom.
N. A method according to paragraphs L and M wherein said step of piloting said drone (10) comprises piloting said drone (10) outdoors.
O. A method according to paragraph K having a cleaning sheet (22) disposed on a complementary head (20), and said step of piloting said drone (10) comprises piloting said drone (10) to clean a floor.
P. A method according to paragraph O comprising the step of cleaning a table or countertop before cleaning a floor.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A drone suitable for cleaning tasks, said drone comprising:
    A chassis for holding components of the drone;
    at least one rotary wing driven by a respective motor;
    a controller for piloting the drone in speed and altitude relative to a target surface;
    at least one strut depending from the chassis;
    a head connected to said at least one strut, the head having a downwardly facing surface to removably receive a cleaning sheet thereon; and
    a shock absorber operatively mounted between said at least one strut and said head for absorbing compressive forces between said head and a target surface.

2. A drone according to claim 1 further comprising a plurality of grippers disposed on the head, the grippers being usable to removably attach a cleaning sheet to the head.

3. A drone according to claim 1 further comprising a plurality of hooks disposed on the downwardly facing surface of the head, the hooks being usable to removably attach a cleaning sheet to the head.

4. A drone according to claim 1 wherein said strut is a telescoping strut.

5. A drone according to claim 4 further comprising a cleaning sheet removably disposed on the head.

6. A drone according to claim 1 further comprising at least one of a vacuum source and a beater bar disposed on the head and being usable to collect debris from a target surface.

7. A drone according to claim 6 wherein the vacuum source or beater bar are driven by a dedicated electric motor, the dedicated motor not being configured to drive a rotor.

8. A method of cleaning a target surface using a drone, said method comprising the steps of:
    providing a drone suitable for cleaning tasks, the drone comprising: a chassis for holding components of the drone; at least one rotary wing driven by a respective motor; a controller for piloting the drone in speed and altitude relative to a target surface; and at least one of an elongate handle connected to said chassis at a proximal end and extending outwardly therefrom to a distal end, said handle being configured to removably receive a cleaning duster thereon and a head having a downwardly facing surface to removably receive a cleaning sheet thereon;

providing a duster or a cleaning sheet complementary to said handle or to said head, respectively;

removably disposing said duster or said sheet onto said handle or said head;

piloting said drone to a target surface, and said step of piloting said drone comprises piloting said drone to clean a floor and comprises the step of piloting said drone to clean a table or countertop; and contacting said duster or a cleaning sheet with the target surface to clean debris therefrom.

9. A method according to claim 8 having a duster disposed on a complementary handle, and said step of piloting said drone comprises piloting said drone to an elevated position outside the reach of the user to clean debris therefrom.

10. A method according to claim 9 wherein said step of piloting said drone comprises piloting said drone outdoors.

11. A method according to claim 8 comprising the step of cleaning a table or countertop before cleaning a floor.

12. A method according to claim 8 comprising the step of removably disposing both a cleaning sheet and a duster on said head and said handle, respectively.

* * * * *